United States Patent [19]
Todd et al.

[11] 4,159,189
[45] Jun. 26, 1979

[54] TIE-IN METHOD AND APPARATUS

[76] Inventors: Robert E. Todd, 87 Ave. Iranshahr, Tehran; Robert D. Foster, 1116 Waugh Dr. #4, Houston, Tex. 77019

[21] Appl. No.: 838,058
[22] Filed: Sep. 30, 1977
[51] Int. Cl.² ............................................. F16L 1/00
[52] U.S. Cl. .................................... 405/169; 405/171
[58] Field of Search ................ 61/110, 111, 112, 113, 61/114, 107, 108, 69; 405/169

[56] References Cited
U.S. PATENT DOCUMENTS

| | | | |
|---|---|---|---|
| 3,508,410 | 4/1970 | Lynch | 61/69 R |
| 3,641,777 | 2/1972 | Banjavich | 61/69 R |
| 3,658,231 | 4/1972 | Gilman | 61/69 R |
| 3,744,258 | 5/1973 | Lochridge et al. | 61/110 |
| 3,835,656 | 9/1974 | McDermott | 61/111 |
| 3,841,105 | 10/1974 | Cannon | 61/112 |
| 4,051,688 | 10/1977 | Ells | 61/110 |

*Primary Examiner*—Jacob Shapiro
*Attorney, Agent, or Firm*—Browning, Bushman & Zamecki

[57] ABSTRACT

A method and system for connecting the ends of a pair of tubular conduits for use at the bottom of a body of water in which terminal portions of said conduits, adjacent to and including said ends, are buoyantly supported in a generally elevated attitude within the body of water with the ends in a zone of the body of water below the surface thereof. The ends are positively fixed against movement relative to each other but permitted limited movement, as a unit, relative to the bottom of the body of water. The connection of the conduit ends is made within the aforementioned zone of the body of water.

31 Claims, 9 Drawing Figures

TIE-IN METHOD AND APPARATUS

BACKGROUND OF THE INVENTION

1. Field of the Invention

The present invention relates to the art of making tie-ins or connections between pipelines for use in subsea environments. Where the site of the pipelines and their connection is in relatively shallow water, the method and means of connection may be relatively uncomplicated. However, in deep water of several hundred meters or more, increasing problems are encountered in making such connections. While the present invention may be advantageously used even in shallow waters, e.g. fifty meters or less, it is especially valuable in that it may be successfully employed in connecting lines for use at depths of five hundred meters and more.

2. Description of the Prior Art

There are presently two main techniques for making tie-ins in deep water subsea pipelines, and both are expensive and fraught with difficulties. In the first, the ends of the two lines to be connected are engaged by lifting apparatus carried by suitable vessels and are raised out of the water while the connection is made. The vessels used for this service must be relatively specialized and are therefore extremely expensive. Since the pipeline ends being connected must be stabilized, it is necessary to wait for relatively calm seas before attempting to make the connection, and such delays entail further expense. Even under ideal conditions, the movements of the supporting vessels in the water are extremely troublesome, particularly where the connection is made by welding. Expensive, heavy duty equipment is employed to fix the pipeline ends, and in the process, the pipelines may be subjected to deleterious stresses and strains.

The second common technique of making pipeline tie-ins involves making the connection at the bottom of the body of water. Again the process is expensive due to the need for expensive deep water diving bells, highly trained divers, etc. Furthermore, the process is dangerous in that fire and other malfunctions are more imminent under the high pressures existing at such depths. The divers can work for only a relatively short time at the great depths involved and, after each work period, must undergo decompression periods greatly exceeding the amount of time actually spent working. Even with proper work periods and decompression, such work is extremely grueling and frequently injurious to the drivers' health.

It can thus be seen that there is great need in the field for a simpler, safer, and less expensive technique for making tie-ins in subsea pipelines, especially in view of the current emphasis on increasing supplies of readily available fossil fuels.

SUMMARY OF THE INVENTION

The present invention, provides a method and system in which connections between the ends of two pipelines or other conduits are made neither at the bottom of the body of water in which the pipelines are to be used, nor above the water, but rather in a generally elevated attitude within the body of water. Terminal portions of the conduits adjacent to and including the ends to be connected are buoyantly supported in such attitude wherein the ends are located in a subsurface zone of the body of water. This zone, which will be referred to herein as the "quiet" or "Q" zone is preferably located generally below the situs of substantial water turbulence but above a depth of substantial diver compression. Such a zone typically extends from about ten meters below the surface of the water to about twenty meters below the surface.

The means of supporting the terminal portions of the pipelines preferably includes a plurality of buoys connected to the pipelines such that, when the terminal portions of the pipelines are in their elevated attitudes, the buoys are each located either within or below the Q zone. The terminal portions of the pipelines are preferably also anchored to the bottom of the body of water. Thus the pipelines are stabilized from points below the situs of any substantial turbulence, caused by e.g., wave action, wind, surface currents, etc. This reduces the forces acting on the conduits and greatly simplifies the process of fixing the ends of the pipelines while the connection is being made.

Further simplification is provided by the application of a new principle in which the ends of the pipelines are positively fixed with respect to each other but are permitted limited movement, as a unit, with respect to the bottom of the body of water, i.e. to the earth. Thus there is no need to attempt to positively fix the terminal portions of the pipelines with respect to the earth as is done in present systems, and what motion of the terminal portions is experienced within the Q zone does not interfere with the welding or other connection process.

Accordingly, many of the problems associated with current techniques of making tie-ins above the surface of the water are eliminated. At the same time, the present invention is substantially free from the difficulties of making connections at great depths. In particular, the work can be done without special deep sea diving equipment and with minimal training requirements for the divers. The dangers of fires, etc. are greatly reduced and the time required for diver decompression is negligible.

The apparatus used in the practice of the present invention preferably includes a habitat assembly including a generally hollow habitat body. The habitat body includes attachment means for engaging the pipelines so that the habitat body is connected to the ends of the pipeline for movement generally therewith. However, the attachment means is designed to permit limited relative movement between the habitat body and the conduits so that, again, the only positive fixation required is of the conduit ends relative to each other. The habitat assembly also inlcudes clamp means within the habitat body for so fixing the conduit ends. In accord with the afore-mentioned objective of minimizing the need for positive fixation of parts, the clamp is supported within the habitat body for limited relative movment with respect thereto. The habitat assembly is buoyantly supported in the Q zone by the buoyantly supported conduits and/or by its own buoy means.

Accordingly it is a principal object of the present invention to provide an improved method of connecting the ends of a pair of tubular conduits for use at the bottom of a body of water.

Another object of the present invention is to provide such a method in which the ends of the conduits are buoyantly supported in a subsurface zone of the body of water and the connection is made within that zone.

A further object of the present invention is to provide a method as described above in which the ends of the conduits are stabilized from below the surface of the water.

Still another object of the present invention is to provide an improved system for connecting such conduits in accord with the present method.

Yet another object of the invention is to provide an improved habitat assembly for making subsurface pipeline connections.

Numerous other objects, features, and advantages of the present invention will be made apparent by the following description of the preferred embodiments, the drawings, and the claims.

DESCRIPTION OF THE PREFERRED EMBODIMENTS

Figure 1:
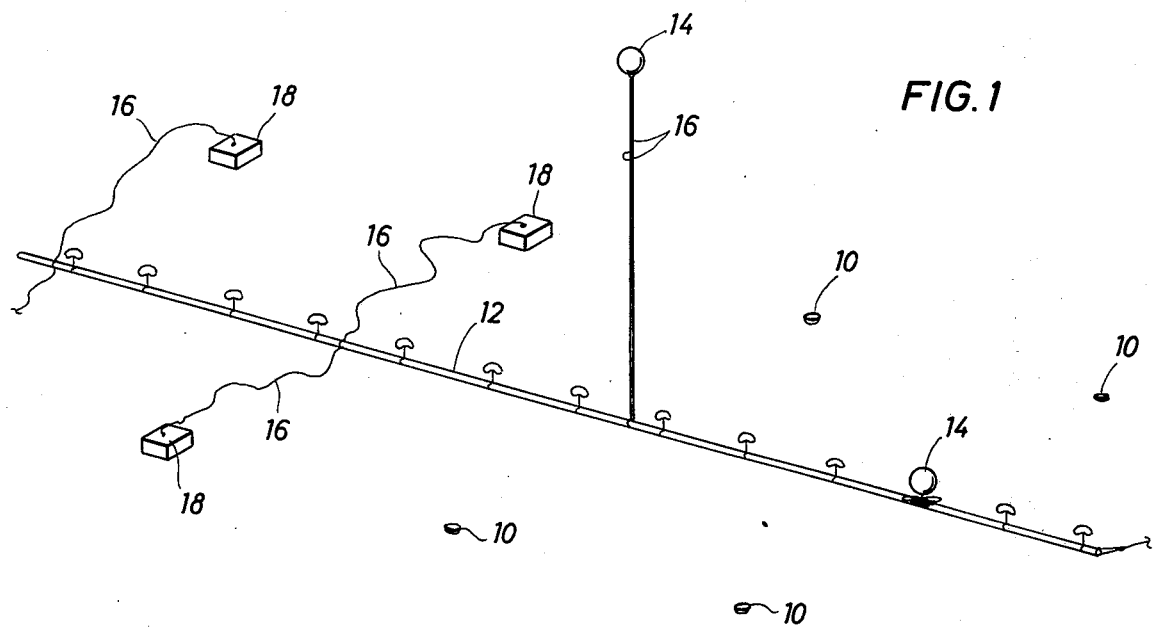
FIG. 1 is a perspective view of one pipeline during the anchoring process.
Figure 4:
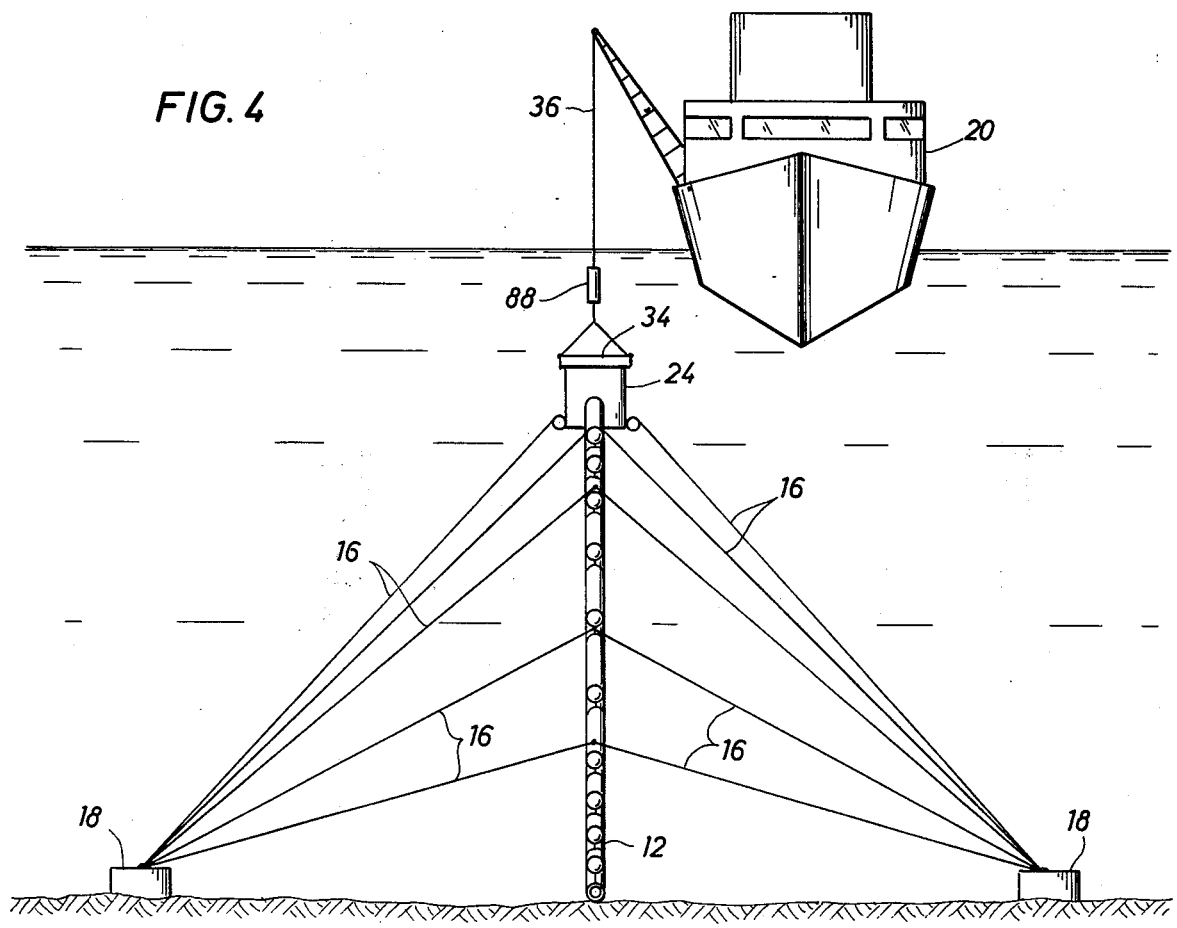
FIG. 4 is an enlarged elevation of the system of FIGS. 2 and 3.
Figure 3:
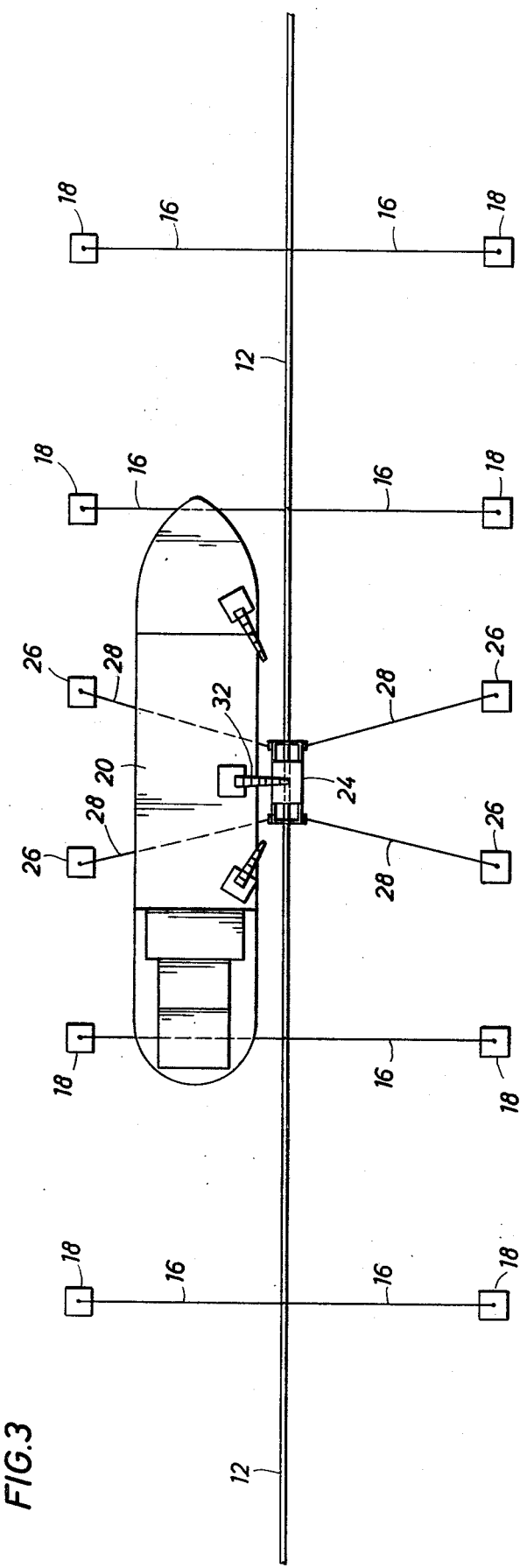
FIG. 3 is a top plan view of the system shown in FIG. 2.

Referring now to the drawings, there is shown a preferred system and method for connecting the ends of a pair of tubular conduits, specifically pipelines, for use at the bottom of a body of water. Briefly, the method involves emplacing the pipelines on the bottom of the body of water, raising terminal portions of the pipelines, including the ends to be connected, to a generally elevated attitude with the ends in a "quiet" zone of the water, and buoyantly supporting said terminal portions in this elevated attitude while the connection is made. It is desirable that the elevated terminal portion of each pipeline assume a generally sigmoid configuration in its elevated attitude. Such configuration, the exact curvature of which will vary depending on the depth of the water, the physical characteristics of the pipelines, and other factors, is the most natural configuration for the terminal portion when the end thereof is elevated and tends to minimize adverse streses and strains on the pipeline.

In accord with this objective, the bottom of the body of water is first surveyed and signal transmitters are emplaced on the bottom of the body of water at spaced locations on either side of the prospective locus of the pipeline. Such transmitters are indicated at 10 in FIG. 1. The pipeline 12 is them made up and emplaced in the proper position between the rows of transmitters 10. Although the pipeline 12 may be emplaced in any suitable manner, including conventional ones, the method and system of the invention are particularly adaptable to a technique in which the pipeline is made up on shore and then pulled to the proper site by a towing vessel. During towing, the pipeline is preferably positioned at the bottom of the body of water but with a slight negative buoyancy, i.e. buoyancy sufficient to reduce the weight of the pipeline, but not sufficient to elevate it. This may be accomplished by a plurality of towing buoys secured to the pipeline closely adjacent thereto.

Figure 8:
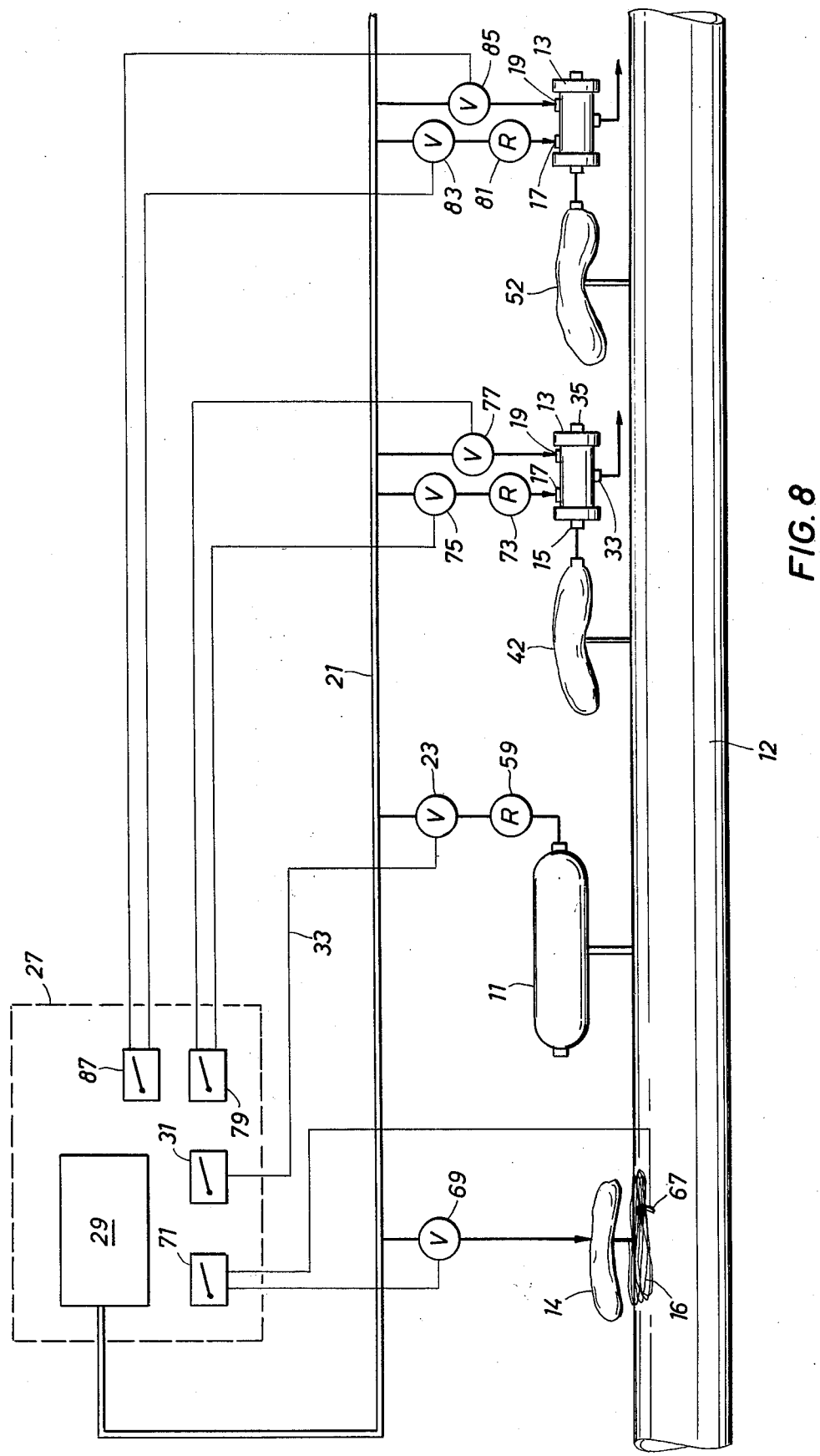
FIG. 8 is a schematic view of a portion of the pipeline and several of the buoys associated therewith.

FIG. 8 diagrammatically illustrates a segment of the pipeline 12 having one of the towing buoys 11 connected thereto. A conduit 21 extends along the terminal portion of the pipeline 12 generally parallel thereto and is carried by the pipeline. The end of conduit 21 extends upwardly to an operating station 27 on board a vessel used to tow the line 12 where it is connected to a source of pressurized air. Buoy 11 is communicatively connected to the conduit 21 via a valve 23 and a pressure regulator 59.

The valve 23 is operable from the operating station 27 in any suitable manner. As indicated in the schematic of FIG. 8, valve 23 is electrically operable through a switch 31 via electrical line 33. Line 33 may be carried by the pipeline 13 in a bundle or "umbilical cord" along with the conduit 21 and other electrical lines to be described hereafter. However, it will be appreciated that numerous other means of operating the valve 23, including ratio, sonic, and other types of remote control signals, may be used. Pressure regulator 59 is chosen and/or adjusted in accord with the weight of the pipeline and other factors to impart the afore-mentioned negative buoyancy in a manner well known in the art.

When the pipeline 12 has reached the desired location, the towing buoys 11 are deflated by operation of switch 31 to close valve 23 and sink the pipeline. It will be understood that each of the towing buoys, only one of which is shown at 11 in FIG. 8, have valves such as 13 associated therewith and that all of these valves may be electrically connected to switch 31 so as to be similutaneously operable thereby.

In addition to the towing buoys 11, a number of other sets of buoys are carried by the pipeline 12 and are preferably selectively automatically actuatable. In particular, a number of anchor buoys 14 are disposed along the terminal portion of the pipeline (see FIGS. 1 and 8). Each anchor buoy 14 is connected to the free ends of a pair of anchor lines 16, the other ends of which are connected to the pipeline 12. The anchor lines 16 are releasably coiled on the pipeline 16. To anchor the pipeline 12, a suitable vessel moves along the terminal portion of the pipeline and the anchor lines 16 are sequentially released while their respective anchor buoys 14 are activated to inflate and carry the free ends of the anchor lines 16 to the surface. As best seen in FIG. 8, each pair of anchor lines 16 are releasably retained in their coiled positions on pipeline 12 by an electrically operable device diagrammatically illustrated at 67. The buoy 14 for each set of lines 16 is connected to the air conduit 21 via a valve 69, also electrically operable. Electrical leads from the device 67 and valve 69 are carried by the pipeline 12 in the aforementioned bundle or umbilical cord and then extend to a switch 71 in the operating station 27. By operation of the switch 71, the respective pair of anchor lines 16 may be released and the buoy 14 inflated to carry the free ends of the lines to the surface of the water.

There, the buoy 14 is removed and a conduit or pipeline anchor 18 is connected to the free end of each line 16. Each anchor 18 is then placed on or near a respective one of the transmitters 10 by a crane or the like carried by the vessel. In this connection, it is noted that numerous different types of transmitters may be employed including transmitters of electronic, radio, radar, sonic, and other signals. Similar transmitters may be disposed on the anchors 18, and suitable receiving means are included on the operating vessel whereby the operator may ascertain the exact locations of the anchors 18 and guide them to the transmitters 10.

While one pipeline 12 is shown in FIG. 1, it will be understood that a substantially identical pipeline is emplaced and anchored in like manner generally parallel to the first line and with the terminal portions of the two lines overlapping. A vessel 20, which may be the same vessel which was used in the anchoring process, is positioned and anchored adjacent the pipeline 12. A habitat assembly including a habitat body 24 is now positioned and suspended in the quiet zone for receipt of the pipelines ends to be connected.

In conjuction with the aforementioned survey of the bottom of the body of water, transmitters, similar to transmitters 10 have been positioned to guide the placement of a set of anchors 26 for the habitat body 24. These anchors 26 are connected to the habitat body 24 on board the vessel 20 by lines 28 which are adjustable via winches 30 on the habitat body 24 (see FIG. 7). With the lines 28 fully extended, the anchors 26 are emplaced on or near the respective ones of the transmitters.

An attachment line 38 is secured to each of the pipelines 12 near the end thereof. This line has its free end connected to a buoy (not shown) similar to the anchor buoys 14 (FIG. 1). These buoys are activated to inflate and carry the attachment lines 38 to the surface. Here the buoys are removed and the attachment lines are secured to respective winches 40 (see FIG. 5) on the habitat body 24.

The habitat body 24 is then lowered into the water by a crane 32 carried by the vessel 20 or by any other suitable means. A motion compensation 88 is disposed in the line 36 connecting habitat body 24 to crane 32 to permit the habitat body to remain relatively stable despite the movements of vessel 20 on the water. The habitat body 24 is equipped with a set of habitat buoys 34 which are preferably programmable to seek and maintain a specified depth. For example, each buoy may have a pressure sensing device associated therewith, a source of pressurized inflating gas, and valves for admitting such gas to and venting it from the buoy. The pressure sensing device is exposed to the ambient pressure of the water and operatively connected to the valves so that, if the buoy should tend to rise above the preferred depth range, gas will be vented from the buoy, and if the buoy should tend to sink below the preferred depth range, more gas will be admitted to the buoy. In particular, the buoys 34 may have control devices similar to the control devices 13 associated with buoys 42 and described more fully below.

Thus the habitat body may be suspended generally at a desired depth within a quiet zone of the water beneath any substantial turbulence such as wave action, surface currents, wind, etc. Since the supporting buoys 34 are also located in the quiet zone, the habitat body is essentially unaffected by such turbulence. This quiet zone is not only below the locus of substantial turbulence, as mentioned above, but is also above the depth of substantial diver compression. Typically, the quiet zone is between about ten to twenty meters below the surface. Thus divers can work within the quiet zone in ordinary scuba gear, rather than deep sea diving equipment, and without the necessity for prolonged periods of decompression following the work periods. Furthermore, since both the habitat body 24 and its supporting buoys 34 are located below the most severe turbulence, movements of the habitat body 24 are minimized. To further stabilize the habitat body 24, the anchor lines 28 are tightened by the winches 30 to place the lines 28 in tension. With the habitat body 24 thus buoyantly suspended in the desired location, the line 36 connecting the habitat body to the crane 32 is slackened so that the habitat body 24 will be not affected by the movements of the vessel 20 on the surface of the water.

Figure 2:
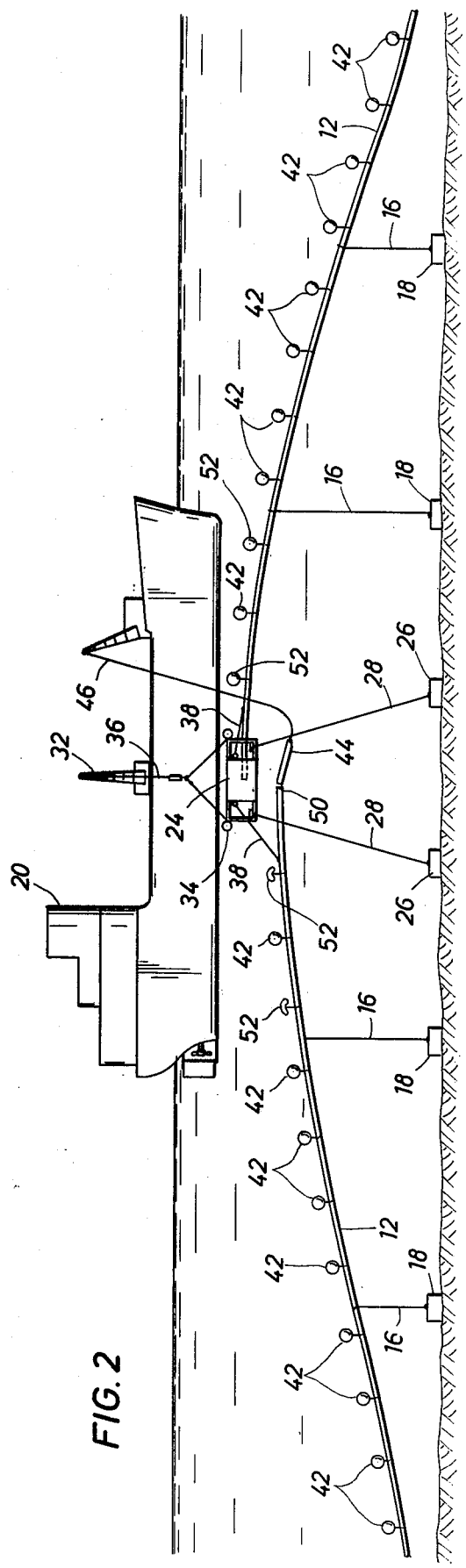
FIG. 2 is a simplified side elevation of the system of the present invention.

The terminal portions of the pipelines 12 may now be raised to their generally elevated attitudes within the quiet zone. The elevated attitude of each pipeline 12 has two stages, a lower stage and an upper stage, in both of which the end of the pipeline is within the quiet zone. In FIG. 2, the pipeline 12 on the left is shown at the lower stage of its elevated attitude, while the pipeline 12 on the right is shown at the upper stage. The distance between the quiet zone and the bottom of the body of water has been shown as relatively small for simplicity of illustration. However, it should be understood that in a typical application, this distance may be several hundred meters or more.

To elevate the pipeline 12 to the lower stage of its elevated attitude, a set of buoys 42 are activated to inflate. Each buoy 42 has a control device 13 shown in FIGS. 8 and 9. The control device 13 of each buoy 42 is pre-programmed to cause the buoy to "seek" a specific depth as determined by the pressure of the water. Each control device 13 is carried by the pipeline 12 either directly or via the buoy 42. The buoy 42 and device 13 per se form no part of the present invention but may form components of the preferred forms of the invention. The control device 13 has an outlet 15 communicatively connected to conduit 21 via a respective valve 75 or 77. The device 13 includes an exhaust outlet 33 and a water pressure inlet 35. The device 13 comprises a housing defining a pair of end chambers. One such chamber is divided by a diaphragm 37 into outer and inner portions 39a and 39b respectively. The other chamber is similarly divided by a diaphragm 41 into outer and inner portions 43a and 43b respectively. The housing further defines a central bore 45 interconnecting the inner portions 39b and 43b of the end chambers. The outer portions 39a and 43a communicate with respective ones of the inlets 17 and 35.

A valve element 47 is slidably received in the bore 45. Valve element 47 includes longitudinally outwardly opening sleeve portions 49 and 51 at its opposite ends interconnected by an intermediate portion 53. Sleeve portions 49 and 51 are sized to fit slidably but fairly tightly within the bore 45, while portion 53 has a reduced outer diameter providing substantial clearance between itself and bore 45. A pair of valve stems 55 and 57 have their inner ends threaded into respective ends of intermediate portion 53 of the valve element and their outer ends connected to respective ones of the diaphragms 37 and 41. Thus the valve element 47 may be slidably moved within the bore 45 by variations of the pressures in outer portions 39a and 43a in the end chambers.

Figure 9:
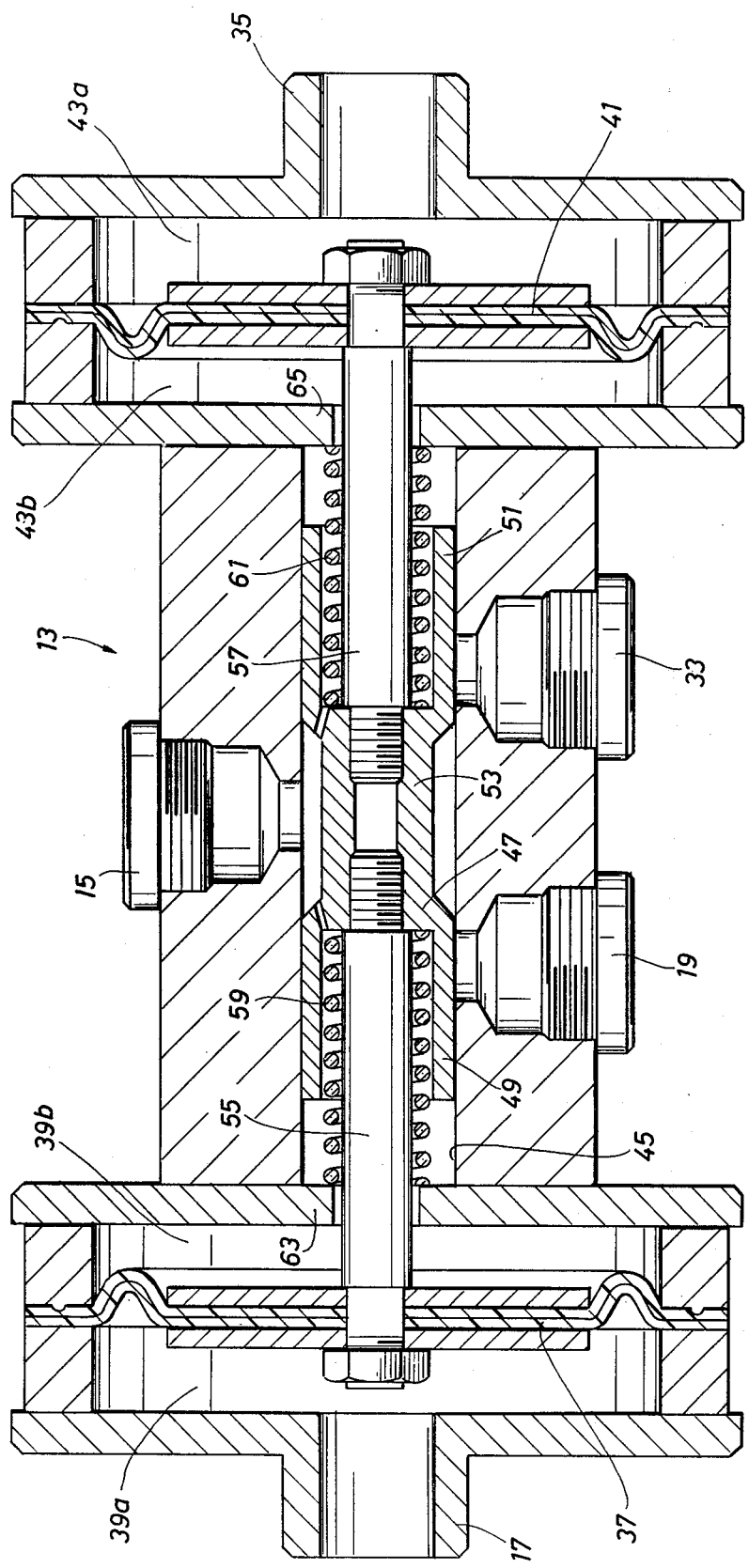
FIG. 9 is a cross-sectional view of a buoy control valve.

Inlet 17 is connected to conduit 21, as mentioned above, with a pressure regulator 73 (FIG. 8) interposed therebetween downstream of the valve 75. When the valve 75 is opened, a pilot pressure, whose value is set by the regulator 73 is admitted to chamber portion 39a to bear against diaphragm 37. Inlet 35 is open to the water surrounding the device whereby the water pressure is brought to bear against diaphragm 41. When the water pressure is substantially equal to the pilot pressure, the valve element 47 is held in a centerred position as shown in FIG. 9. In this position, sleeve 49 covers the inner end of inlet 19 thereby preventing introduction of air from conduit 21 into the bore 45. Similarly, sleeve 51 covers the inner end of exhaust outlet 33 preventing communication of the bore 45 therewith. Springs 59 and 61 are interposed between respective ends of portion 53 of the valve element 47 and respective flanges 63 and 65 extending radially into bore 45 to help maintain the normally centerred position of the valve element.

By properly choosing or adjusting the regulator 73, the pilot pressure may be made equal to the water pressure at a predetermined depth within or below the "Q" zone. Device 13 will then cause the buoy 42 to selectively inflate and deflate to seek and maintain that depth. For example, if the buoy 42 and connected device 13 begin to rise above the preferred depth, the water pressure will begin to decrease. The pilot pressure acting on diaphragm 37 will then cause the valve element 47 to move to the right as viewed in FIG. 9. The inner ends of both outlet 15 and outlet 33 will then be in register with the reduced diameter portion 53 of the valve element and in communication with bore 45. Thus reverse exhaust flow of air from the buoy 42 will be permitted to deflate the buoy. However, if the buoy 42 and device 13 sink below the preferred depth, the water pressure acting on diaphragm 41 will exceed the pilot pressure acting on diaphragm 37. The valve element will then be moved to the left bringing reduced diameter portion 15. Thus air from conduit 21 will be admitted to inflate the buoy. Hysteresis may cause the valve element to move alternately to the left and the right for progressively smaller lengths of time until the apparatus is stabilized at the desired depth.

Each of the valves 75 and 77 is electrically operable, having a lead line extending to a common switch 79 in the operating station 27. The valves 75 and 77 for the various buoys 42 may all be connected to switch 79 to be simultaneously operated thereby. Likewise, the various pilot pressure inlets 17 for the devices 13 of the various buoys 42 are connected to a common pressure source, i.e. source 29. However, by proper choice of the respective pressure regulator 73 associated with each buoy 42, various ones of the buoys 42 may be preprogrammed to seek—and thus carry the adjacent portions of the pipeline 12 to—different depths. The depths sought by each buoy 42 are such as to give the pipeline 12 the desired sigmoid configuration in its elevated attitude.

The anchor lines 16 are of predetermined lengths corresponding to this desired configuration. Thus, as they are placed in tension, the lines 16 also help to constrain the terminal portion of the pipeline to the desired configuration and to stabilize the pipeline. As the pipeline 12 is being raised, the attachment lines 38 are shortened by the winches by divers who have, by this time, enterred the habitat body 24.

When the terminal portion of the pipeline has reached the lower stage of its elevated attitude, the divers sever the pulling head 44 by which the pipeline was previously towed to the connection site. The towing line 46 is preferably still attached to the head 44 and is used to raise the head 44 to the vessel 20. This leaves an end 50 of the pipeline 12 suitable for attachment to another similar pipeline end disposed directly beneath the habitat body 24. The bottom and ends of the habitat body are open for receipt of a section of the terminal portion of the pipeline 12 adjacent the end 50.

The terminal portions of the pipeline is now raised to the upper stage of its elevated attitude in which the end 50 is disposed within the habitat body. This secondary elevation is accomplished by actuation of still another set of buoys 52 carried by the pipeline 12. Buoys 52 are similar to buoys 42, having control devices 13, but are fewer in number and are disposed only near the end 50 rather than along the entire length of the terminal portion of the pipeline. The pilot pressure inlets 17 of the devices 13 for the buoys 52 are connected to conduit 21 via pressure regulators 81 and electrically operable valves 83. The corresponding inflation inlets 19 are also connected to conduit 21 via electrically operable valves 85. The electrical leads for the valves 83 and 85 of all the buoys 52 may be connected to a common switch 87 in the operating station 27 for simultaneous activation. As the buoys 52 are being inflated, the attachment line 38 is drawn in by the winch 40 to guide the end 50 into the habitat body 24. The terminal portion of the other pipeline 12 is then elevated and its end drawn into the habitat body in a similar manner.

Figure 5:
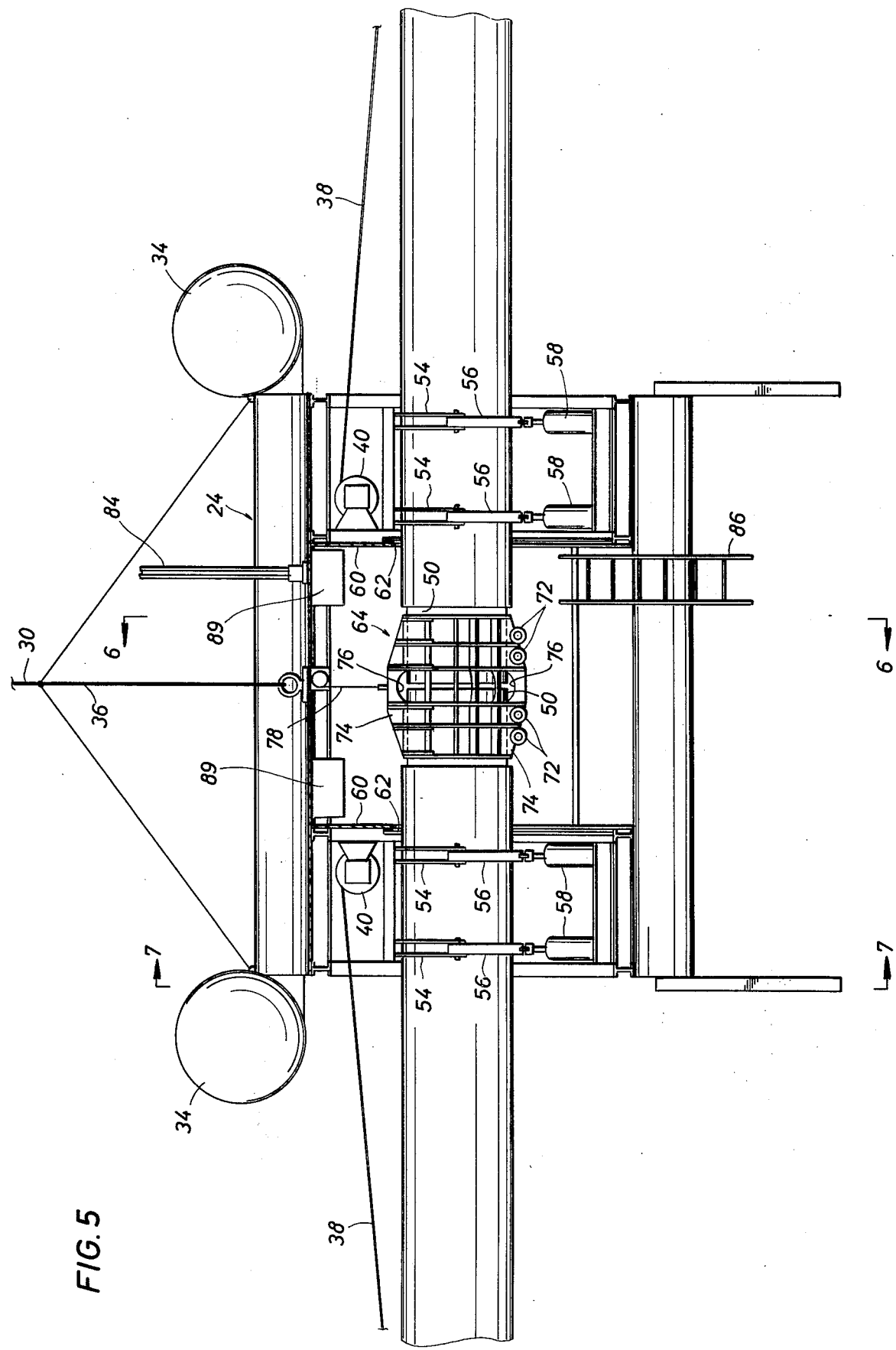
FIG. 5 is a side elevation of the habitat assembly with parts broken away.
Figure 7:
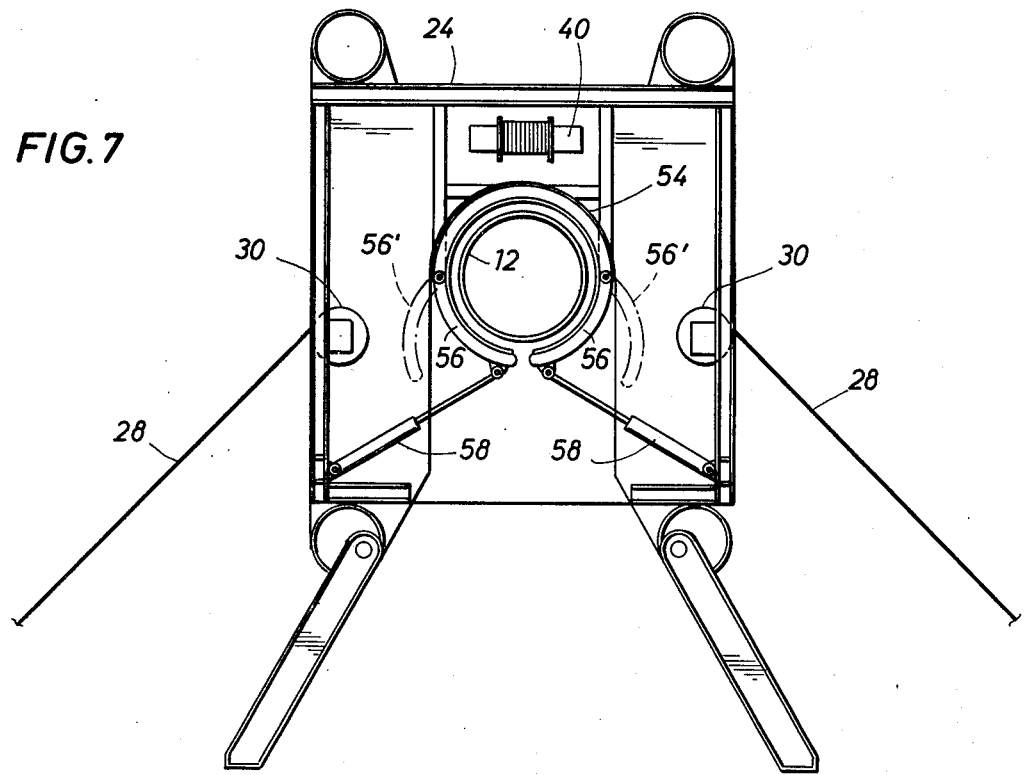
FIG. 7 is a transverse cross-sectional view of the habitat assembly taken on lines 7—7 of FIG. 5.

The habitat body is then connected to the pipelines 12 by a plurality of clasp assemblies best seen in FIGS. 5 and 7. There are two such clasp assemblies at each end of the habitat body 24 and each clasp assembly is comprised of an upper semi-circular segment 54 and two lower arcuate segments 56 each pivotally connected to a respective edge of the upper segment 54. The lower end of each segment 56 has the piston rod of a respective hydraulic ram assembly 58 pivotally connected thereto. The cylinder portion of each ram assembly 58 is pivotally connected to the habitat body 24.

When the pipelines 12 are brought into the habitat body 24, the segments 56 are held in an open or outer position as indicated in phantom at 56' in FIG. 7. Each pipeline is then brought into abutment with and positioned by the upper segments 54 of the clasp assemblies at the respective end of the habitat body 24. Segments 56 are then closed, i.e. brought into the position shown in solid lines in FIG. 7, to substantially encircle the pipeline 12 and connect it to the habitat body.

Each end of the habitat body 24 is also provided with a set of doors 60 which can be closed and locked around the pipes 12 and sealed with respect thereto by seals 62. Neither the clasp assemblies 54,56 nor the doors 60 are required or intended to positively fix the pipes 12 for the actual connection process. Rather, the clasp assemblies 54,56 serve only to connect and roughly position the habitat body 24 and pipes 12, while the doors 60 serve to seal off the ends of the habitat body so that the water can be pumped out to provide a dry workplace therein. Accordingly, both the clasp asemblies 54,56 and the doors 60 are designed to permit limited relative movement between the pipelines 12, particularly their ends 50, and the habitat body 24. Indeed, one of the important principles of the invention is that, rather than attempting to positively fix the pipes 12 relative to the habitat body 24 or to the earth, the ends of the pipes only are positively fixed with respect to each other. However, the two pipe ends, as a unit, are permitted limited relative movement with respect to both the habitat body and the earth, as represented by the bottom of the body of water.

This positive fixing of the ends of the pipes 12 is accomplished by a clamp assembly 64 which is disposed within the habitat body and forms a part of the habitat assembly. As best seen in FIG. 5, the pipelines 12 have an outer coating of concrete, terminating short of the ends 50. To prepare the pipe ends 50 for connection to each other, a pup joint may be affixed to one of the ends 50 in a manner well known in the art, the pup joint thereby forming an extension of the pipe end 50. The pup joint would be sized so that, when the ends 50 are received in the clamp assembly, they will be spaced apart by only a slight clearance suitable for receipt of a weld. The exterior surfaces of the ends 50 may also be prepared, e.g. by sandblasting, to provide better frictional engagement with the clamp assembly 64.

Figure 6:
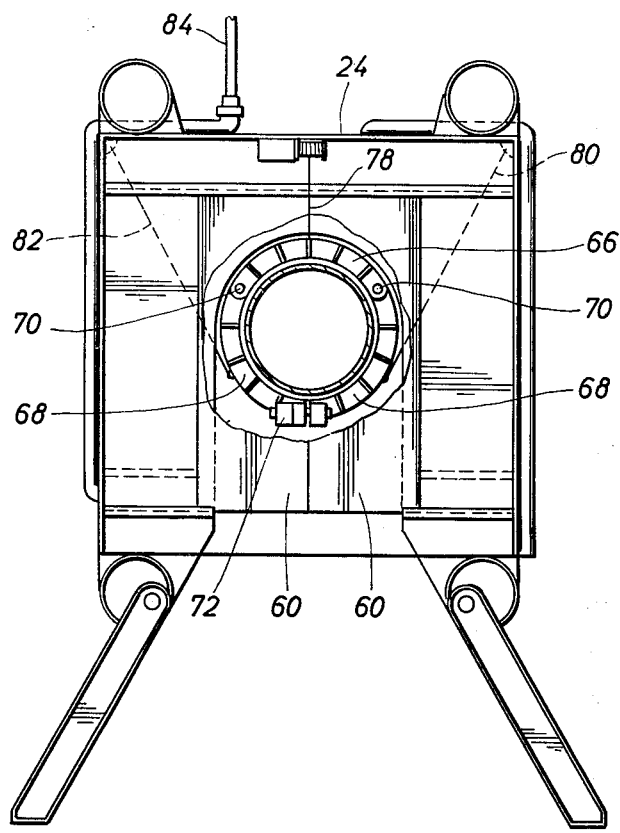
FIG. 6 is a transverse cross-sectional view of the habitat assembly taken on lines 6—6 of FIG. 5.

As best seen in FIGS. 5 and 6, the clamp assembly 64 is formed of three arcuate segments, an upper segment 66 and two lower segments 68 (see FIG. 6). Each of the lower segments 68 is pivotally connected to a respective one of the lower edges of the upper segment 66 by a respective hinge 70. Thus the lower segments 68 may be moved toward or away from each other respectively to encircle or release the ends 50. Segments 68 may be locked in closed position by bolt assemblies 72.

Each of the segments of the clamp assembly is comprised of a plurality of extremely strong and rigid parallel ribs 74 extending longitudinally of the clamp assembly to bridge the gap between the two pipe ends 50. Adjacent ones of the ribs 74 are spaced apart circumferentially of the clamp assembly and each rib has a recess 76 formed in its radially inner surface adjacent the gap between the two ends 50. This permits tools to be inserted between and under the ribs 74 to weld the two pipe ends together. Initially, the clamp assembly 64 is suspended from the roof of the habitat body by three cables 78, 80 and 82 each connected to a respective one of the segments 66 and 68. After the clamp assembly has been firmly fastened around the pipe ends, these cables 78, 80 and 82 may be loosened as the clamp assembly is now supported by the connected pipes 12. Thus, the aforementioned limited freedom of the ends 50 of the pipes 12 as a unit together with the clamp assembly 64 is maintained.

The clamp assembly 64 is strong enough to positively fix the pipe ends 50 against movement relative to each other, whether it be angular movement, transverse movement, or longitudinal movement of the ends 50 toward and away from each other. In this connection it should be emphasized that the clamp assembly is much stronger than conventional pipe clamps and capable of imposing much greater clamping forces, its mass being many times that of the pipe ends which it is to connect. The radially inner surface of the clamp assembly and the radially outer surfaces of the ends 50 may be suitably treated in any suitable manner to enhance the frictional engagement between these surfaces.

The relative movement between the two pipe ends 50 themselves is the only movement which must be absolutely precluded in order to ensure a proper weld. Accordingly, limited relative movement between these two ends, as a unit, is permitted and accommodated by the present system, whereby the expense of attempting to provide equipment adequate to fix the pipe ends 50 against all movement relative to the earth or to the habitat body is eliminated. However, the latter relative movements are reduced to acceptable limits so that they will not interfere with the operations attendant upon making the connection by the present system.

Thus, to summarize, the terminal portions of the pipelines 12 are suspended within and below the subturbulent quiet zone by buoyant means also located within or below this zone and are anchored or stabilized with respect to the bottom of the body of water. This substantially reduces movement of said terminal portions. However, to the extent that these terminal portions do move, their movements will not interfere with the formation of a good weld as long as the ends 50 are positively fixed with respect to each other by the clamp assembly 64 and are constrained to move as a unit with respect to the bottom of the body of water. The habitat body 24, being attached to the terminal portions of the pipelines, may move generally therewith without adverse affects. Again, however, should the pipelines 12 or their ends 50 move relative to the habitat body 24, a good weld can still be obtained as long as the pipe ends 50 are fixed with respect to each other and constrained to move as a unit. Accordingly, an even more limited amount of movement is permitted between the unit comprising the ends 50 and the clamp assembly 64 with respect to the habitat body 24. The expense of the habitat body, and especially the clasp assemblies 54,56 and doors 60, is consequently minimized. Thus the buoys, anchor lines and habitat body may be viewed as effecting increasingly finer adjustments in the proper positioning of the pipe ends, with the final positive positioning being accomplished by the clamp assembly.

Referring again to FIGS. 5-7, the habitat body 24 is also equipped with an umbilical cord 84 containing a plurality of electrical, hydraulic, and other lines extending to the vessel 20 to provide power, air, communication, etc. to the habitat body 24. A ladder 86 is provided to allow the divers to enter and exit the habitat body through the open bottom. The habitat body is also provided with storage compartments 89.

After the doors 60 of the habitat body have been closed, the water has been pumped out of the sealed central portion of the habitat body between doors 60 by a pump (not shown), and the clamp assembly 64 engaged with the pipe ends 50, the welding proceeds in a manner well known in the art. When the weld is completed, the pipelines 12 are disengaged from the clamp assembly and habitat body by generally reversing the steps described above in connection with engaging the pipes in the habitat assembly. The habitat body 24 may then be removed from the water by means of the cables 36 and crane 32 while playing out the lines 28. The lines 38 are detached from the habitat body either before or after removal of the habitat body from the water.

The buoys 42 and 52 supporting the terminal portions of the pipelines 12 may then be deflated or detached and recovered for re-use, preferably by automatic means, and the anchor lines 16 may be similarly disconnected. The terminal portions of the pipelines are then replaced on the bottom of the body of water in any suitable way. In particular, they may either be laid over to one side in a manner conventional in the art, or the remote end of one or both of the lines may be pulled to straighten out the curve in the terminal portions of the lines and draw them toward the bottom of the body of water.

From the foregoing it can be seen that the present invention provides an improved system and method for making pipeline tie-ins. By supporting the pipeline ends within a quiet zone of the body of water, and stabilizing them from below the surface, most of the disadvantages of prior techniques, both those involving connections made at the bottom of the body of water and those made above the surface of the water, are eliminated. Furthermore, the the expense of the process is greatly reduced through the elimination of the need for deep sea diving equipment, heavy duty apparatus for stabilizing the pipeline ends with respect to the earth, highly specialized vessels forming the base of operations, etc.

It can also be appreciated that numerous modifications of the exemplary system and method described above may be made without departing from the spirit of the invention. For example, the preferred system described involves the use of relatively sophisticated buoys for supporting the terminal portions of the pipelines. Such buoys are disposed along the entire length of the terminal portion of each pipeline and are operative to automatically seek and maintain specified depths so as to generally constrain the terminal portions to given configurations. Accordingly in this embodiment, anchor lines are needed only near the ends of the terminal portions and, in some instances might even be dispensed with. However, in other systems and methods, ordinary buoys, inflated sufficiently to raise the pipelines to the surface if unrestrained, may be used in conjunction with a larger number of anchor lines spaced along the entire lengths of the terminal portions.

The control devices 13 for all the buoys 42, 52 and 34 have been described as being of the type illustrated in FIG. 9. However, certain of these devices may be replaced by simplified control devices in which the water pressure is resisted by a spring rather than by a control pressure. Furthermore, the various buoys may be provided with air inlet and exhaust means to compensate for variations in the water pressure with varying depth to prevent crushing or bursting of the buoys.

The embodiment described above refers to a system and method in which the connection is to be made between the two pipelines by welding. However, the invention can be adapted to operations in which mechanical connections are used. Also, while the invention has particular merit in making tie-ins for deep water pipelines and has been described in that context, it can also be used to advantage in making connections in lines to be used in quite shallow water, e.g. fifty meters or even less, in maintaining the preferable sigmoid configuration of the elevated pipe to avoid damage thereto and in avoiding surface turbulence. Numerous other modifications in the specified mechanical elements involved in the various parts of the syttem, their configurations, etc. may also be made within the purview of the invention. Accordingly, it is intended that the scope of the invention be limited only by the claims which follow.

We claim:

1. A method of connecting the ends of a pair of tubular conduits for use at the bottom of a body of water, comprising the steps of:
   buoyantly supporting terminal portions of said conduits adjacent to and including said ends in a generally elevated attitude within said body of water with said ends in a zone of said body of water below the surface thereof;
   and connecting said ends within said zone while so supporting said terminal portions.

2. The method of claim 1 wherein said zone is located generally below substantial water turbulence and generally above a depth of substantial diver compression.

3. The method of claim 2 wherein said zone extends from about 10 meters below the surface of said body of water to about 20 meters below the surface of said body of water.

4. The method of claim 1 wherein said terminal portions of said conduits are buoyantly supported in said generally elevated attitude by means within or below said zone.

5. The method of claim 4 preceded by the step of emplacing said conduits on the bottom of said body of water with a plurality of deflated buoy means secured thereto.

6. The method of claim 5 wherein a respective first set of said buoy means is inflated to raise said terminal portion of each of said conduits to said generally elevated attitude.

7. The method of claim 6 wherein the inflation of said first sets of buoy means is preceded by anchoring of said conduits to the bottom of said body of water to limit movement of said terminal portions upwardly from said elevated attitude.

8. The method of claim 7 wherein a second set of said buoy means is secured to each of said conduits by a plurality of anchor lines, and wherein said anchoring is accomplished by inflating said second set of buoy means to raise the free ends of said anchor lines to the surface of said body of water, securing conduit anchor means to the free ends of said anchor lines, and positioning said conduit anchor means on the bottom of said body of water.

9. The method of claim 8 wherein said anchor lines are of predetermined lengths and said conduit anchor means are emplaced in predetermined positions to at least partially restrict said terminal portions of said conduits to preferred configurations in said elevated attitude.

10. The method of claim 5 wherein said buoys of said first sets are selectively inflated to at least partially restrict said terminal portions of said conduits to preferred configurations in said elevated attitude.

11. The method of claim 5 wherein each of said first sets of buoy means raises the terminal portion of the respective conduit to a lower stage of said elevated attitude, wherein said ends of said conduits are at least partially prepared for said connection at said lower stage, wherein a third set of said buoy means on each of said conduits are inflated subsequent to said preparation to raise said terminal portions of said conduits to an upper stage of said elevated attitude, and wherein said connection is made at said upper stage of said elevated attitude.

12. The method of claim 11 wherein a habitat body is buoyantly supported in said zone of said body of water, wherein said lower stage of said elevated attitude is located generally below said habitat body and wherein said connection is made within said habitat body.

13. The method of claim 12 wherein said connection is made while positively fixing said ends against movement relative to each other but permitting limited movement of said ends, as a unit, relative to the bottom of said body of water.

14. The method of claim 1 wherein a habitat body is buoyantly supported in said zone of said body of water by means within said zone and wherein said connection is made within said habitat body.

15. The method of claim 14 wherein said habitat body is secured to said conduits for movement therewith relative to the bottom of said body of water.

16. The method of claim 15 wherein limited movement of said ends, as a unit, is permitted relative to said habitat body.

17. The method of claim 14 wherein said habitat body is anchored to the bottom of said body of water.

18. The method of claim 1 wherein said connection is made while positively fixing said ends against movement relative to each other but permitting limited movement of said ends, as a unit, relative to the bottom of said body of water.

19. A system for connecting the ends of a pair of tubular conduits for use at the bottom of a body of water, comprising:
   means for buoyantly supporting terminal portions of said conduits adjacent to and including said ends in a generally elevated attitude within said body of water with said ends in a zone of said body of water below the surface thereof,
   retaining means for positively fixing said ends against movement relative to each other;
   and means for buoyantly supporting said retaining means in said zone of said body of water and permitting limited relative movement of said retaining means and said ends, as a unit, relative to the bottom of said body of water.

20. The system of claim 19 wherein, when said terminal portions of said conduits are in said generally elevated attitude, said means buoyantly supporting said terminal portions are located within or below said zone.

21. The system of claim 19 wherein said means for supporting said terminal portions comprises a respective first set of buoy means secured to each of said conduits.

22. The system of claim 21 wherein each of said first sets of buoy means is operative to raise the terminal portion of the respective one of said conduits to said generally elevated attitude.

23. The system of claim 21 further comprising conduit anchor means anchoring said conduits to the bottom of said body of water to limit movement of said terminal portions upwardly from said elevated attitude.

24. The system of claim 23 further comprising a plurality of conduit anchor lines secured to each of said conduits, and respective second sets of buoy means for each of said conduits, each buoy means of said second sets being connected to the free end of a respective one of said conduit anchor lines and removable therefrom and replaceable with a respective one of said conduit anchor means.

25. The system of claim 24 wherein said anchor lines are of predetermined lengths and said conduit anchor means are disposed in predetermined positions to at least partially restrict said terminal portions of said conduits to preferred configurations in said elevated attitude.

26. The system of claim 22 wherein said buoys of said first sets are selectively inflated to at least partially restrict said terminal portions of said conduits to preferred configurations in said elevated attitude.

27. The system of claim 22 wherein each of said first sets of buoy means is operative to raise the terminal portion of the respective conduit to a lower stage of said elevated attitude, and further comprising a third set of buoy means on each of said conduits operative to raise the terminal portions of said conduits to an upper stage of said elevated attitude.

28. The system of claim 19 further comprising a habitat body generally surrounding said ends and secured to said conduits for movement generally with said ends.

29. The system of claim 28 wherein said retaining means comprises clamp means within said habitat body.

30. The system of claim 29 wherein said clamp means is supported within said habitat body for limited movement of said clamp means and said ends of said conduits, as a unit, relative to said habitat body.

31. The system of claim 19 wherein said retaining means is releasably engageable with said ends of said conduits.